(12) United States Patent
Bei

(10) Patent No.: US 9,544,203 B2
(45) Date of Patent: Jan. 10, 2017

(54) MOBILE TERMINAL FLOW IDENTIFICATION METHOD AND APPARATUS

(71) Applicant: TENCENT TECHNOLOGY (SHENZHEN) COMPANY LIMITED, Shenzhen (CN)

(72) Inventor: Xiaoling Bei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 382 days.

(21) Appl. No.: 14/185,044

(22) Filed: Feb. 20, 2014

(65) Prior Publication Data

US 2014/0321316 A1 Oct. 30, 2014

Related U.S. Application Data

(63) Continuation of application No. PCT/CN2013/088327, filed on Dec. 2, 2013.

(30) Foreign Application Priority Data

Apr. 27, 2013 (CN) .......................... 2013 1 0152899

(51) Int. Cl.
*H04L 12/26* (2006.01)
*H04W 76/02* (2009.01)

(52) U.S. Cl.
CPC .......... *H04L 43/026* (2013.01); *H04W 76/021* (2013.01)

(58) Field of Classification Search
None
See application file for complete search history.

(56) References Cited

U.S. PATENT DOCUMENTS

2004/0106422 A1* 6/2004 Ericsson ............... H04M 15/83
455/514
2006/0165009 A1* 7/2006 Nguyen .............. H04L 12/2854
370/252

(Continued)

FOREIGN PATENT DOCUMENTS

CN 1304605 A 7/2001
CN 101179842 A 5/2008

(Continued)

OTHER PUBLICATIONS

The State Intellectual Property Office of the People's Republic of China (SIPO) office Action 1 for 201310152899.4 Nov. 3, 2015 pp. 1-7.

(Continued)

*Primary Examiner* — Zewdu A Beyen
(74) *Attorney, Agent, or Firm* — Anova Law Group, PLLC

(57) ABSTRACT

A method is provided for flow identification of a mobile terminal. The method includes obtaining flow data files of the mobile terminal at two or more points of time after the mobile terminal connects to a network using same network access means. The method also includes comparing, from the obtained flow data files, flow volumes in the flow data files having a same flow identifier to determine a flow identifier in the flow data file with changing flow volumes. Further, the method includes, based on the determined flow identifier in the flow data files with changing flow volumes and the network access means used by the mobile terminal to connect to the network, identifying network access means indicated by the flow identifier in the flow data files and obtaining flow identification results.

6 Claims, 4 Drawing Sheets

(56) References Cited

U.S. PATENT DOCUMENTS

| 2008/0137540 | A1* | 6/2008 | Botvich | H04L 12/2697 |
| | | | | 370/241 |
| 2014/0047103 | A1* | 2/2014 | Dankberg | H04L 12/1489 |
| | | | | 709/224 |

FOREIGN PATENT DOCUMENTS

| CN | 101860942 A | 10/2010 |
| CN | 103002466 A | 3/2013 |
| CN | 103052088 A | 4/2013 |
| WO | 2004030383 A1 | 4/2004 |

OTHER PUBLICATIONS

The World Intellectual Property Organization (WIPO) International Search Report for PCT/CN2013/088327 Mar. 13, 2014 pp. 1-3.

* cited by examiner

MOBILE TERMINAL FLOW IDENTIFICATION METHOD AND APPARATUS

CROSS-REFERENCES TO RELATED APPLICATIONS

This application is a continuation application of PCT Patent Application No. PCT/CN2013/088327, filed on Dec. 2, 2013, which claims priority of Chinese Patent Application No. 201310152899.4, filed on Apr. 27, 2013, the entire contents of all of which are incorporated by reference herein.

FIELD OF THE INVENTION

The present disclosure generally relates to the mobile communication technologies and, more particularly, to a method and system for identifying mobile terminal data flow information.

BACKGROUND

With the intelligent operating system being widely used in mobile terminals, the number of applications that can be run on mobile terminals is increasing greatly. After a mobile terminal connects to the network by various network access means, such as Wi-Fi or GPRS, the mobile terminal can send data to the network or download data from the network, generating data flows. In order to understand the interaction between the mobile terminal and the network, the mobile terminal in general is provided with a flow monitoring function. By using the traffic monitoring function, the flow data generated after the mobile terminal connects to the network via a variety of network access means can be monitored, and the monitored flow data can be stored in a flow data file. The flow data file includes a flow identifier and a flow volume. The flow identifier is for identifying the network access means used by the mobile terminal to access the network, and the flow volume is the amount of traffic or data flow generated by the mobile terminal after the mobile terminal connects to the network using the network access means identified by the traffic flow identifier.

For different types or models of mobile terminals, the flow identifiers used for identifying the network access means in the flow data file may be different, or the same flow identifier in flow data files of the different models of mobile terminals identifies different network access means. For example, in a certain model of mobile terminals, the flow data file uses flow identifier 'Eth0' to identify Wi-Fi network access, while in another type of mobile terminals, the traffic data file uses 'Ers' to identify Wi-Fi network access. In some other models of mobile terminals, the flow data file uses identifier 'Eth0' to identify GPRS network access. Thus, it is difficult to identify the flow data files in different types of mobile terminals. The identifying efficiency is low, and it is inconvenient to perform flow monitoring for various types of mobile terminals.

The disclosed method and system are directed to solve one or more problems set forth above and other problems.

BRIEF SUMMARY OF THE DISCLOSURE

One aspect of the present disclosure includes a method for flow identification of a mobile terminal. The method includes obtaining flow data files of the mobile terminal at two or more points of time after the mobile terminal connects to a network using same network access means. The method also includes comparing, from the obtained flow data files, flow volumes in the flow data files having a same flow identifier to determine a flow identifier in the flow data file with changing flow volumes. Further, the method includes, based on the determined flow identifier in the flow data files with changing flow volumes and the network access means used by the mobile terminal to connect to the network, identifying network access means indicated by the flow identifier in the flow data files and obtaining flow identification results.

Another aspect of the present disclosure includes a mobile terminal flow identification apparatus. The flow identification apparatus includes a file obtaining unit, a flow volume comparing unit, and a flow identification unit. The file obtaining unit is configured to obtain flow data files of a mobile terminal at two or more points of time after the mobile terminal connects to a network using same network access means. The flow volume comparing unit is configured to compare flow volumes in the obtained flow data files having a same flow identifier to determine a flow identifier in the flow data file with changing flow volumes. Further, the flow identification unit is configured to, based on the determined flow identifier in the flow data files with changing flow volumes and the network access means used by the mobile terminal to connect to the network, identify network access means indicated by the flow identifier in the flow data files, and to obtain flow identification results.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

As provided by the disclosed embodiments, after a mobile terminal uses the same network access means to connect to the network, at two or more points of time, the flow data files of the mobile terminal are obtained accordingly. The flow volumes with the same flow identifier in the obtained flow data files are compared, and the flow identifier with changing flow volume in the flow data files is determined. Based on the flow identifier with changing flow volume in the flow data files as well as the network access means used by the mobile terminal to connect to the network, the network access means corresponding to the various flow identifiers in the flow data files can be determined. Thus, the network access means indicated by the various flow identifiers in the flow data files can be determined, and it can also be determined what types of network access means used by the mobile terminals to connect to the network and to generate the data flow at the flow volume corresponding to the flow identifiers in the flow data file.

Figure 7:
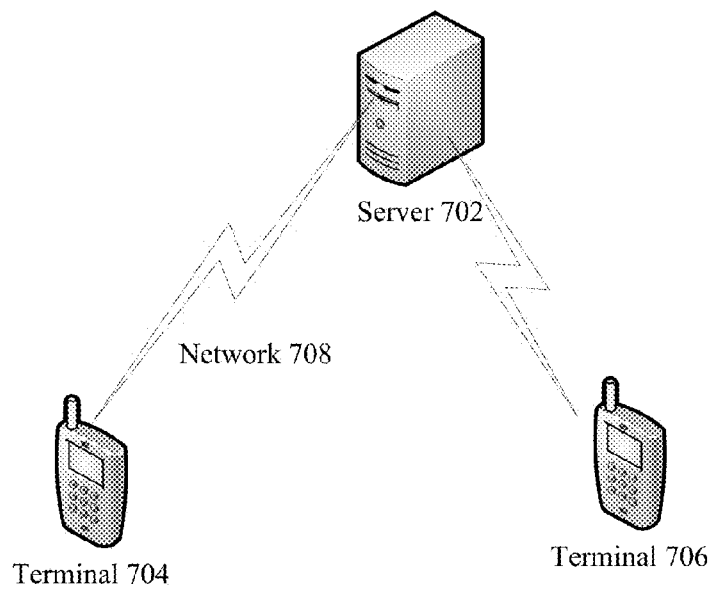
FIG. 7 illustrates an exemplary operating environment incorporating certain disclosed embodiments.

FIG. 7 illustrates an exemplary operating environment 700 incorporating certain disclosed embodiments. As shown in FIG. 7, environment 700 may include a server 702, a terminal 704, a terminal 706, and network 708. The network 708 may include any appropriate type of communication network for providing network connections to the terminals 704 and 706 and the server 702. For example, network 708 may include the Wi-Fi network, cellular network, or other types of computer networks or telecommunication networks, either wired or wireless.

A server, as used herein, may refer to one or more server computers configured to provide certain server functionalities to provide certain server services. A server may also include one or more processors to execute computer programs in parallel. Although only one server is shown, any number of servers can be included. The server 702 may be operated in a cloud or non-cloud computing environment.

Terminal 704 or terminal 706 may include any appropriate type of mobile computing devices, such as mobile phones, smart phones, tablets, notebook computers, or any type of computing platform.

Figure 8:
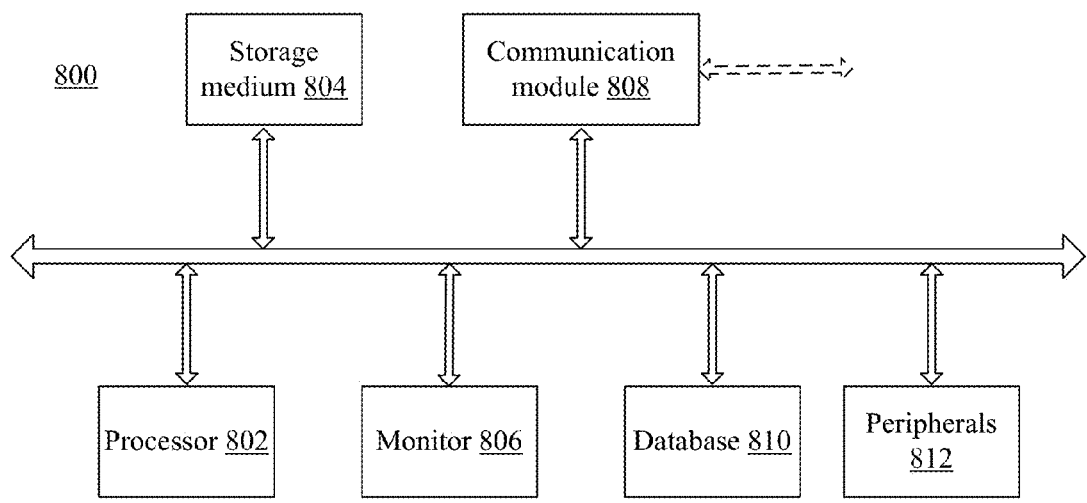
FIG. 8 illustrates a block diagram of an exemplary computer system consistent with the disclosed embodiments.

Terminal 704/706 and/or server 702 may be implemented on any appropriate computing platform. FIG. 8 illustrates a block diagram of an exemplary computer system 800 capable of implementing terminal 704 and/or server 702.

As shown in FIG. 8, computer system 800 may include a processor 802, a storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as Read-only memory (ROM), Random Access Memory (RAM), flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as keyboard and mouse, and communication module 808 may include network devices for establishing connections through the communication network. Database 810 may include one or more databases for storing certain data and for performing certain operations on the stored data, such as database searching.

Figure 1:
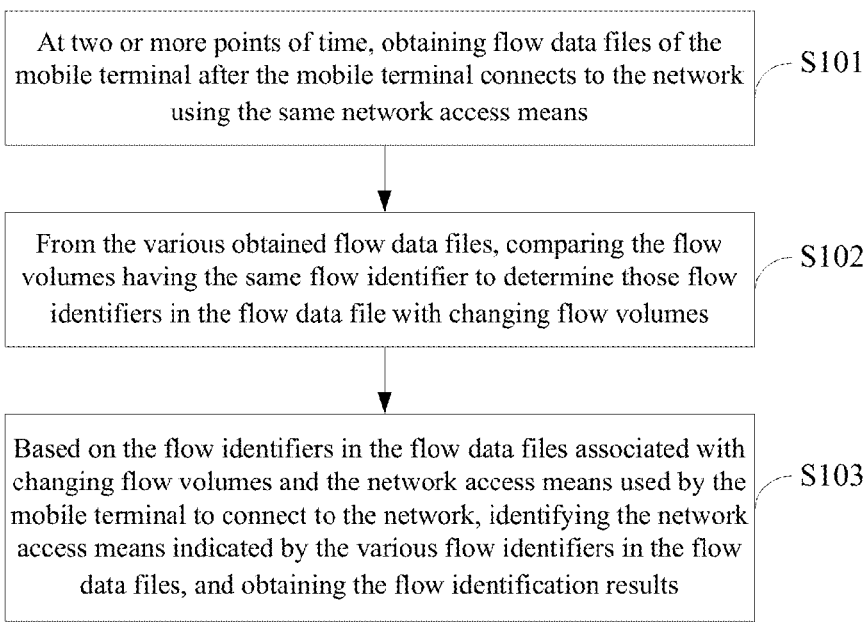
FIG. 1 illustrates an exemplary flow identification process of a mobile terminal consistent with the disclosed embodiments.

In operation, terminal 704/706 and/or server 702 may provide terminal traffic flow monitoring functionalities to a user of the terminal. FIG. 1 illustrates an exemplary flow identification process of a mobile terminal consistent with the disclosed embodiments.

As shown in FIG. 1, the mobile terminal flow identification process may include the following steps.

Step S101: at two or more points of time, obtaining flow data files of the mobile terminal after the mobile terminal connects to the network using the same network access means.

The network access means used by the mobile terminal to access the network may include, but not limited to, a Wi-Fi network access or a GPRS (General Packet Radio Service), network access, a 3G wireless network access, or a 4G LTE network access, etc.

The flow data file of the mobile terminal may refer to a file for recording the data flow generated by the mobile terminal after the mobile terminal connects to the network via various network access means. A separate flow data file may be created at one point of time, or the flow data file may include data for multiple points of time. The flow data file may include flow identifiers for identifying the network access means used by the mobile terminal to access the network, and flow volumes for indicating the data flow generated by the mobile terminal after connecting to the network using the network access means identified by the flow identifiers.

For example, when the mobile terminal connects to the network through Wi-Fi network access means and generates data flow, the flow data file includes a flow identifier identifying the Wi-Fi network access means and a flow volume indicating the data flow generated by the mobile terminal through the Wi-Fi network access. When the mobile terminal connects to the network through GPRS network access means and generates data flow, the flow data file includes a flow identifier identifying the GPRS network access means and a flow volume indicating the data flow generated by the mobile terminal through the GPRS network access. Further, when the mobile terminal connects to the network through another type of network access means and generates traffic flow, the flow data file includes a flow identifier identifying another type of network access means and a flow volume indicating the data flow generated by the mobile terminal through the other type of network access.

In certain embodiments, the flow volume includes a transmission flow volume and a receiving flow volume. The transmission flow volume refers to the data flow generated by the mobile terminal transmitting data to the network, and the receiving flow volume refers to the data flow generated by the mobile terminal receiving data from the network.

For example, Table 1 below illustrates an exemplary flow data file.

TABLE 1

| Flow identifier | Transmission flow volume | Receiving flow volume |
| --- | --- | --- |
| Eth0 | 333245 | 1559 |
| rmnet1 | 13303 | 574 |

As shown in Table 1, the flow data file includes two flow identifiers, Eth0 and rmnet1, respectively. After the mobile terminal connects to the network using the network access means identified by the flow identifier Eth0, the flow volume received from the network is 333245, and the flow volume transmitted to the network is 1559. The unit of the volume number may be bits/Kbits/Mbits, bytes/Kbytes/Mbytes, or other units, etc. Similarly, after the mobile terminal connects to the network using the network access means identified by the flow identifier rmnet1, the flow volume received from the network is 13303, and the flow volume transmitted to the network is 574.

The flow data file of the mobile terminal is created by flow data obtained at two or more points of time. For example, when the mobile terminal uses a network access means to connect to a network and also maintains the network connection for a certain time period. During this time period, at least two points of time may be determined, randomly or by user configuration, and the flow data of the mobile terminal at these points of time are obtained.

Alternatively, after the mobile terminal uses the network access means to connect to the network, the flow data of the mobile terminal is obtained periodically, until a preset number of flow data files are created. The period for obtaining the flow data may also be configured or be a default value.

For example, when the mobile terminal uses the Wi-Fi network access means to access the network and maintains the network connection from 2:00 AM to 2:00 PM on Nov. 10, 2013, at least two points of time during 2:00 AM to 2:00 PM on Nov. 10, 2013, is determined. Assuming the points of time determined are 2:05 AM, 2:06 AM, and 2:07 AM, when the system time reaches 2:05 AM on Nov. 10, 2013, the flow data of the mobile terminal is obtained; when the system time reaches 2:06 AM on Nov. 10, 2013, the flow data of the mobile terminal is again obtained; and when the system time reaches 2:07 AM on Nov. 10, 2013, the flow data of the mobile terminal is again obtained. Thus, a total of three (3) flow data files are created.

Alternatively, after the mobile terminal uses the Wi-Fi network access means to connect to the network, the flow data of the mobile terminal is obtained for every preset time period (e.g., one minute), until a preset number of flow data files (e.g., 3) are created.

Tables 2-4 show the exemplary flow data files obtained at three points of time after the mobile terminal uses the same network access means to connect to the network.

TABLE 2

| Flow identifier | Transmission flow volume | Receiving flow volume |
| --- | --- | --- |
| Eth0 | 333245 | 1559 |
| rmnet1 | 13303 | 574 |

TABLE 3

| Flow identifier | Transmission flow volume | Receiving flow volume |
| --- | --- | --- |
| Eth0 | 333666 | 1559 |
| rmnet1 | 13303 | 574 |

TABLE 4

| Flow identifier | Transmission flow volume | Receiving flow volume |
| --- | --- | --- |
| Eth0 | 333777 | 1559 |
| rmnet1 | 13303 | 574 |

As shown in Tables 2-4, the receiving flow volume increases over the three points of time with the Wi-Fi network access means, while transmission volume remains the same. Also, flow volumes for the other network access means does not change.

The flow data file of the mobile terminal may be read or obtained by any appropriate method. For example, the flow data file of the mobile terminal may be obtained from storage path for storing the flow data file on the mobile terminal.

In certain embodiments, the operating system of the mobile terminal may monitor the data flow of the mobile terminal when the mobile terminal connects to the network through various network access means, and may record the monitored traffic flow in a flow data file with a specified storage path.

For example, when a mobile terminal uses the Android operating system, the Android operating system monitors the flow of the mobile terminal when the mobile terminal connects to the network through various network access means, and records the monitored traffic flow in the flow data file of /proc/net/dev. Thus, the flow data file can be obtained by simply reading the /proc/net/dev file.

Step S102: from the various obtained flow data files, comparing the flow volumes having the same flow identifier to determine those flow identifiers in the flow data file with changing flow volumes.

For example, if the obtained flow data files are shown in Tables 2-4, flow volumes of the flow identifiers Eth0 and rmnet1. For the flow identifier Eth0, the total flow volume (i.e., the sum of the receiving flow volume and the transmission flow volume) corresponding to the flow identifier Eth0 may be compared among the flow data files.

Specifically, in Table 2, the total flow volume corresponding to the flow identifier Eth0 is sum of the receiving flow volume and the transmission flow volume 333245+1559=334804; in Table 3, the total flow volume corresponding to the flow identifier Eth0 is sum of the receiving flow volume and the transmission flow volume 333666+1559=335225; and, in Table 4, the total flow volume corresponding to the flow identifier Eth0 is sum of the receiving flow volume and the transmission flow volume 333777+1559=335336. Thus, after comparing the total flow volumes corresponding to the flow identifier Eth0, it can be determined that the flow volume of the flow identifier Eth0 is changing. On the other hand, with respect to the flow identifier rmnet1 in Tables 2-4, the total flow volumes corresponding to the flow identifier rmnet1 do not change.

Alternatively, the receiving flow volume and the transmission flow volume corresponding to a flow identifier may be compared separately. If at least one of the receiving flow volume and the transmission flow volume corresponding to the flow identifier changes, it can be determined that the flow volume corresponding to the flow identifier changes.

In the above example shown in Tables 2-4, the receiving flow volumes corresponding to the flow identifier Eth0 may be compared. For example, in Table 2, the receiving flow volume of the flow identifier Eth0 is 333245; in Table 3, the receiving flow volume of the identifier Eth0 is 333666; and, in Table 4, the receiving flow volume of the identifier Eth0 is 333777. Thus, it can be determined that the receiving flow volumes of the flow identifier Eth0 have changed.

Further, the transmission flow volumes of the flow identifier Eth0 shown in Tables 2-4 are also compared. For example, in Table 2, the transmission flow volume of the flow identifier Eth0 is 1559; in Table 3, the transmission flow volume of the flow identifier Eth0 is 1559; and, in Table 4, the transmission flow volume of the flow identifier Eth0 is 1559. Thus, it can be determined that the transmission flow volumes of the flow identifier Eth0 have not changed. However, because the receiving flow volumes changed, it can be determined that the flow volume of the flow identifier Eth0 changed.

Step S103: based on the flow identifiers in the flow data files associated with changing flow volumes, and also based on the network access means used by the mobile terminal to connect to the network, the network access means indicated by the various flow identifiers in the flow data files can be identified, and the flow identification results can be obtained.

In certain embodiments, when the mobile terminal obtains the flow data files, the network access means used by the mobile terminal can be obtained at the same time. The follows may be performed to identify the network access means indicated by the various flow identifiers in the flow data files and to obtain the flow identification results.

The network access means identified by the flow identifier in the flow data files having flow volume changes is set as the network access means used by the mobile terminal. For example, in the above example shown in Tables 2-4, it can be determined that the flow identifier in the flow data files with flow volume changes is the flow identifier Eth0.

If the flow data shown in Tables 2-4 is obtained at 3 points of time after the mobile terminal connects to the network using the Wi-Fi network access means, it can be determined that the volume change reflected in the flow data files is the flow volume change generated after the mobile terminal connects to the network using the Wi-Fi network access network means. Thus, the network access means identified by the flow identifier Eth0 in the flow data files is identified as the Wi-Fi network access means.

If the flow data shown in Tables 2-4 is obtained at 3 points of time after the mobile terminal connects to the network using the GPRS network access means, it can be determined that the volume change reflected in the flow data files is the flow volume change generated after the mobile terminal connects to the network using the GPRS network access network means. Thus, the network access means identified by the flow identifier Eth0 in the flow data files is identified as the GPRS network access means.

For illustrative purposes, Table 5 shows the flow identification results using the flow identification process described above.

As shown in Table 5 below, the flow identification results indicate that the network access means identified by the flow identifier Eth0 in the flow data files is the Wi-Fi network access, and the flow identification results indicate that the network access means identified by the flow identifier rmnet1 in the flow data files is the GPRS network access.

TABLE 5

| | |
|---|---|
| Eth0 | Wi-Fi network access means |
| rmnet1 | GPRS network access means |

Therefore, according to the disclosed embodiments, after a mobile terminal uses the same network access means to connect to the network, at two or more points of time, the flow data files of the mobile terminal are obtained accordingly. The flow volumes with the same flow identifier in the obtained flow data files are compared, and the flow identifier with changing flow volume in the flow data files is determined. Based on the flow identifier with changing flow volume in the flow data files as well as the network access means used by the mobile terminal to connect to the network, the network access means corresponding to the various flow identifiers in the flow data files can be determined. Thus, no matter how the various flow identifiers in the flow data files are configured, the network access means indicated by the various flow identifiers in the flow data files can be determined, and the data flow generated under the various network access means can also be determined, improving the traffic flow monitoring on the mobile terminal.

For example, after the mobile terminal connects to the network using the Wi-Fi network access, the flow data files of the mobile terminal are created on two or more points in time. If data flow is generated after the mobile terminal connects to the network, the flow volume corresponding to the flow identifier in the flow data files indicating the Wi-Fi network access is bound to change. Thus, the network access means indicated by the flow identifier with volume changes is determined as the Wi-Fi network access means, i.e., the data flow with volume change is the data flow generated by the mobile terminal connecting to the network using the Wi-Fi network access means.

Figure 2:
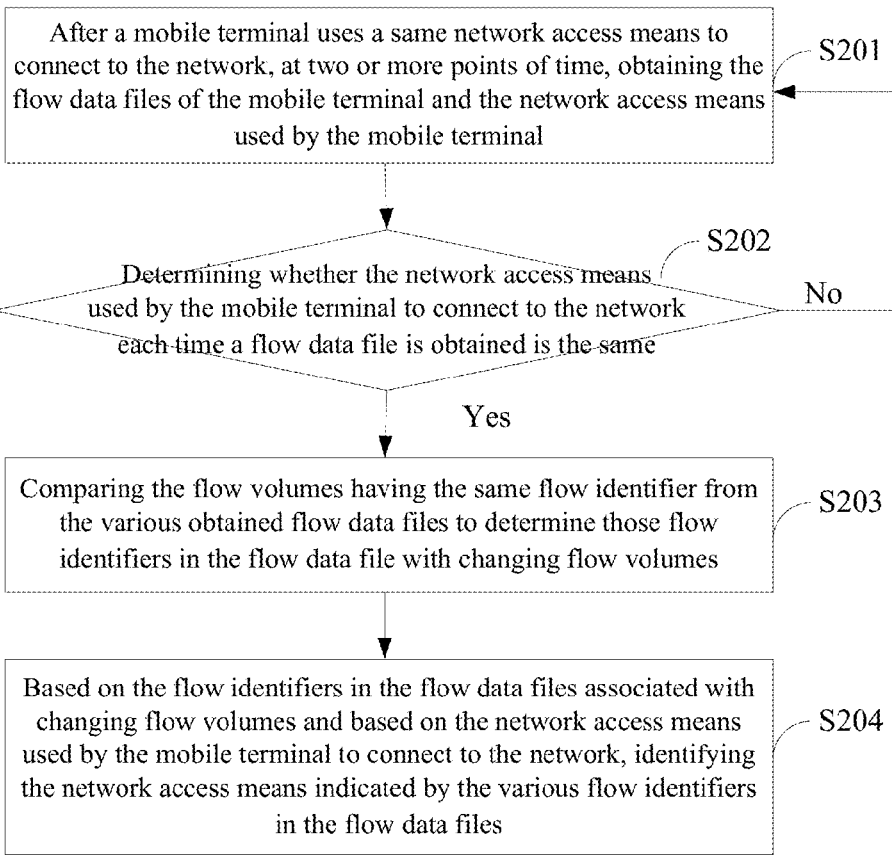
FIG. 2 illustrates another exemplary flow identification process of a mobile terminal consistent with the disclosed embodiments.

FIG. 2 shows another exemplary flow identification process consistent with the disclosed embodiments. As shown in FIG. 2, the flow identification process may include the following steps.

Step S201: after a mobile terminal uses a same network access means to connect to the network, at two or more points of time, obtaining the flow data files of the mobile terminal and the network access means used by the mobile terminal.

Step S202, determining whether the network access means used by the mobile terminal to connect to the network each time a flow data file is obtained (i.e., each point of time) is the same. If the network access means at each point of time is the same, continuing the process from Step 203. On the other hand, if the network access means at each point of time is not the same, returning to Step S201.

In one embodiment, by determining whether the same network access means is used by the mobile terminal to connect to the network each time when a flow data file is created, the subsequent flow identification process steps are performed only when it is determined that the same network access means is used. Thus, it can be ensured that all the flow data files obtained are the flow data files created when the mobile terminal uses the same network access means to connect to the network, and the accuracy of the flow identification can be improved.

In another embodiment, when determining whether the same network access means is used, it is determined whether a network switch event happens when two consecutive flow data files are generated. If no network switch event happens, the flow identification process goes to Step 203. On the other hand, if a network switch event happens, the flow identification process returns to Step 201. Thus, it can be ensured that all the flow data files obtained at two or more points of time are the flow data files created when the mobile terminal uses the same network access means to connect to the network.

Step S203: comparing the flow volumes having the same flow identifier from the various obtained flow data files to determine those flow identifiers in the flow data file with changing flow volumes.

Step S204: based on the flow identifiers in the flow data files associated with changing flow volumes and based on the network access means used by the mobile terminal to connect to the network, identifying the network access means indicated by the various flow identifiers in the flow data files.

Figure 3:
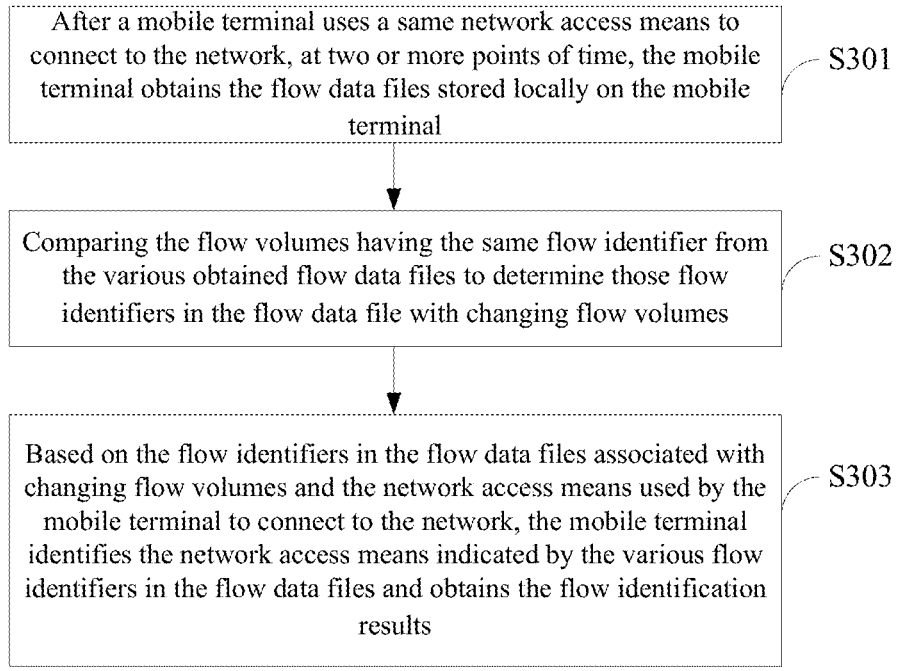
FIG. 3 illustrates another exemplary flow identification process of a mobile terminal consistent with the disclosed embodiments.

FIG. 3 shows another exemplary flow identification process consistent with the disclosed embodiments. As shown in FIG. 3, the flow identification process may include the following steps.

Step S301: after a mobile terminal uses a same network access means to connect to the network, at two or more points of time, the mobile terminal obtains the flow data files stored locally on the mobile terminal.

Step S302: comparing the flow volumes having the same flow identifier from the various obtained flow data files to determine those flow identifiers in the flow data file with changing flow volumes.

In certain embodiments, each time the mobile terminal obtains a flow data file, the mobile terminal also obtains the network access means used by the mobile terminal. Further, the mobile terminal determines whether the network access means used by the mobile terminal to connect to the network each time a flow data file is obtained (i.e., each point of time) is the same.

If the network access means at each point of time is the same, the flow volumes having the same flow identifier from the various obtained flow data files are compared to determine those flow identifiers in the flow data file with changing flow volumes. On the other hand, if the network access means at each point of time is not the same, the mobile terminal re-obtain flow data files.

Step S303: based on the flow identifiers in the flow data files associated with changing flow volumes and the network access means used by the mobile terminal to connect to the network, the mobile terminal identifies the network access means indicated by the various flow identifiers in the flow data files and obtains the flow identification results.

In certain other embodiments, the mobile terminal may send terminal information stored in its ROM (e.g., the terminal model, etc.) and the flow identification results to a server, such that the server can send the flow identification results to other mobile terminals having the same model.

Figure 4:
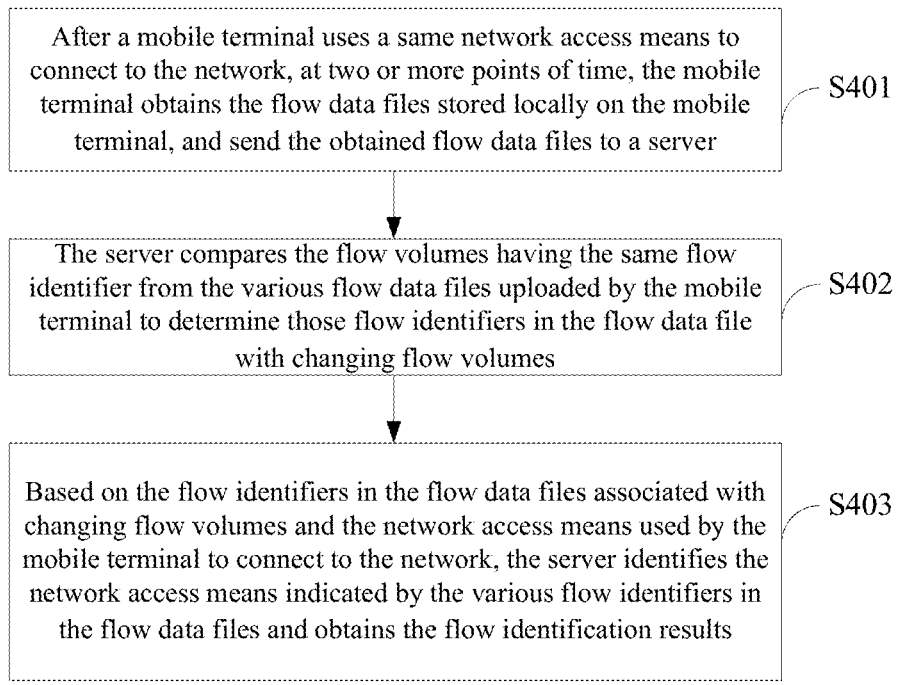
FIG. 4 illustrates another exemplary flow identification process of a mobile terminal consistent with the disclosed embodiments.

FIG. 4 shows another exemplary flow identification process consistent with the disclosed embodiments. As shown in FIG. 4, the flow identification process may include the following steps.

Step S401: after a mobile terminal uses a same network access means to connect to the network, at two or more points of time, the mobile terminal obtains the flow data files stored locally on the mobile terminal, and send the obtained flow data files to a server.

For example, each time the mobile terminal to obtain a flow data file, the mobile terminal uploads the flow data file to the server immediately. Or the mobile terminal may obtain a certain number of flow data files, and upload all the flow data files to the server.

Alternatively, after a mobile terminal uses a same network access means to connect to the network, the mobile terminal may obtain a flow data file stored locally on the mobile terminal for every preset time period, and send the obtained flow data files to the server.

In certain embodiments, each time the mobile terminal obtains a flow data file, the mobile terminal also obtains the network access means used by the mobile terminal, and determines whether the network access means used by the mobile terminal to connect to the network each time a flow data file is obtained (i.e., each point of time) is the same.

If the network access means at each point of time is the same, the mobile terminal sends the obtained flow data files to the server. On the other hand, if the network access means at each point of time is not the same, the mobile terminal re-obtain flow data files.

Step S402: the server compares the flow volumes having the same flow identifier from the various flow data files uploaded by the mobile terminal to determine those flow identifiers in the flow data file with changing flow volumes.

Step S403: based on the flow identifiers in the flow data files associated with changing flow volumes and the network access means used by the mobile terminal to connect to the network, the server identifies the network access means indicated by the various flow identifiers in the flow data files and obtains the flow identification results.

Specifically, after receiving the various flow data files uploaded from the mobile terminal, the server may obtain the network access means in the various flow data files. Based on the flow identifiers in the flow data files associated with changing flow volumes and the network access means used by the mobile terminal to connect to the network, the server identifies the network access means indicated by the various flow identifiers in the flow data files.

Additionally or optionally, when the mobile terminal uploads the flow data file to the server, the mobile terminal may also send terminal information stored in its ROM (e.g., the terminal model, etc., also-called ROM information) to the server. The server may associate the ROM information with the flow identification results and store them in a flow identifier database. The flow identifier database may refer to a database for storing the relationship between the ROM information of the mobile terminal and the flow identification results. Table 6 illustrates an example.

TABLE 6

| ROM 1 | Eth0 | Wi-Fi network access means |
|---|---|---|
|  | rmnet1 | GPRS network access means |

As shown in Table 6, the ROM information of the mobile terminal is ROM 1, and the flow identification results corresponding to ROM 1 indicate that the network access means identified by the flow identifier Eth0 in the flow data files is the Wi-Fi network access, and the flow identification results indicate that the network access means identified by the flow identifier rmnet1 in the flow data files is the GPRS network access.

Additionally and/or optionally, before Step 402, the server may obtain the ROM information of the mobile terminal uploading the flow data files, and may match the obtained ROM information with the stored relationships between the ROM information and the flow identification results in the flow identifier database. If there is any match, the network access means indicated by the flow identifiers in the flow data files can be identified directly based on the flow identifier database. If there is no match, Step 402 is then performed.

Thus, by using the flow identifier database to store the relationships between the ROM information of mobile terminals and the flow identification results, after receiving ROM information and flow data files from a mobile terminal, the flow identifiers in the flow data files uploaded by the mobile terminal can be identified based on the flow identifier database, significantly simplifying the flow identification process on the server.

Further, the server may send the flow identification results or the relationships between the ROM information of mobile terminals and the flow identification results stored in the flow identifier database to the mobile terminal, such that the mobile terminal can obtain the flow identification results from the server.

Figure 5:
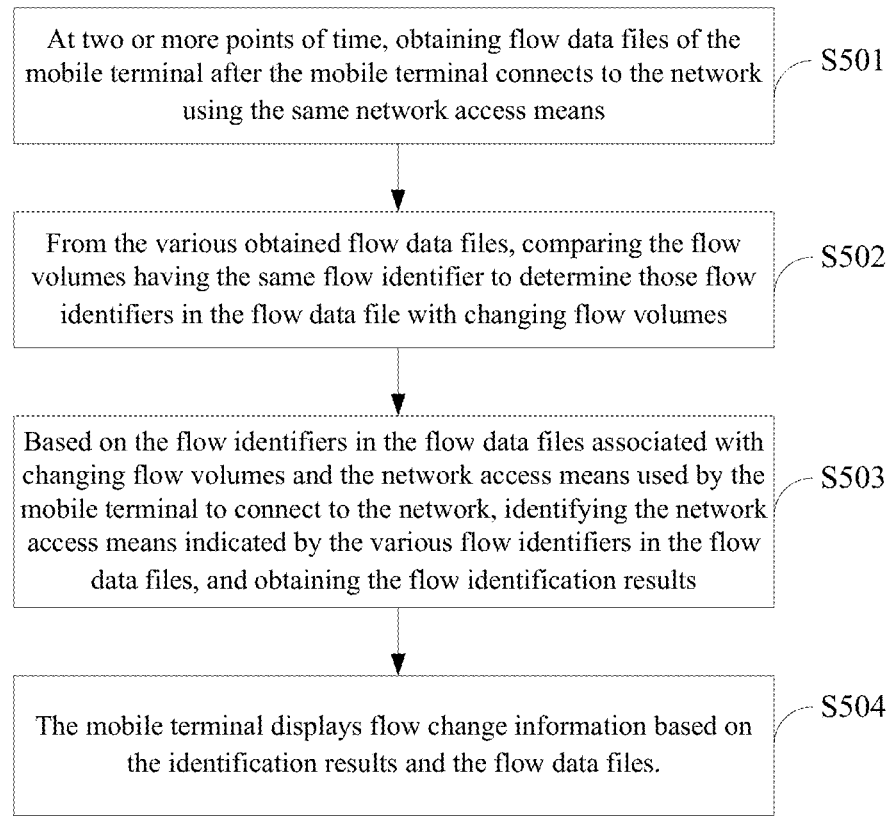
FIG. 5 illustrates another exemplary flow identification process of a mobile terminal consistent with the disclosed embodiments.

FIG. 5 shows another exemplary flow identification process consistent with the disclosed embodiments. As shown in FIG. 5, Steps S501, S502, and S503 are similar to Steps S101, S102, and S103 shown in FIG. 1, the descriptions of which are omitted.

Step S504: the mobile terminal displays flow change information based on the flow identification results and the flow data files. The flow change information may include the network access means indicated by the flow identifiers and the data flow generated when the mobile terminal connects to the network using the network access means.

The flow change information may be displayed using a floating window. Further, to avoid the floating window from interfering with the user of the mobile terminal, the floating window may be set to translucent. Further, the floating window may respond to instructions to move the floating window, such that the user can move the floating window to a user-specified position to reduce the interference with the user's using of the mobile terminal.

Figure 6:
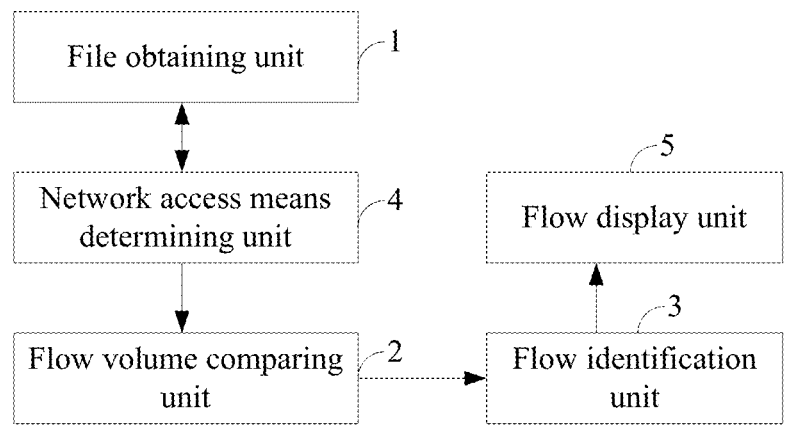
FIG. 6 is a block diagram of an exemplary flow identification apparatus consistent with the disclosed embodiments.

FIG. 6 illustrates an exemplary flow identification apparatus consistent with the disclosed embodiments. The flow identification apparatus may be used on the mobile terminal. For example, the flow identification apparatus may be software program units running on the mobile terminal, hardware units, or a combination of software units and hardware units. The flow identification apparatus may be a plug-in component integrated into the mobile terminal or an application running on the mobile terminal, etc.

As shown in FIG. 6, the flow identification apparatus may include a file obtaining unit 1, which is configured to, at two or more points of time, obtain flow data files of the mobile terminal after the mobile terminal connects to the network using the same network access means.

The network access means used by the mobile terminal to access the network may include, but not limited to, a Wi-Fi network access or a GPRS (General Packet Radio Service), network access, a 3G wireless network access, or a 4G LTE network access, etc.

The flow data file of the mobile terminal may refer to a file for recording the data flow generated by the mobile terminal after the mobile terminal connects to the network via various network access means. A separate flow data file may be created at one point of time, or the flow data file may include data for multiple points of time. The flow data file may include flow identifiers for identifying the network access means used by the mobile terminal to access the network, and flow volumes for indicating the data flow generated by the mobile terminal after connecting to the network using the network access means identified by the flow identifiers. The flow volume includes a transmission flow volume and a receiving flow volume.

Further, the flow identification apparatus may also include a flow volume comparing unit 2. The flow volume comparing unit 2 is configured to compare the flow volumes having the same flow identifier from the various obtained flow data files to determine those flow identifiers in the flow data file with changing flow volumes.

The flow volume comparing unit 2 may compare the total flow volumes (i.e., the sum of the receiving flow volume and the transmission flow volume) corresponding to the flow identifiers in the flow data files to determine those flow identifiers in the flow data file with changing flow volumes.

Alternatively, the flow volume comparing unit 2 may separately compare the receiving flow volumes and the transmission flow volumes corresponding to flow identifiers corresponding to the flow identifiers in the flow data files. If at least one of the receiving flow volume and the transmission flow volume corresponding to a flow identifier changes, it can be determined that the flow volume corresponding to the flow identifier changes.

Further, the flow identification apparatus may also include a flow identification unit 3. The flow identification unit 3 is configured to, based on the flow identifiers in the flow data files associated with changing flow volumes and the network access means used by the mobile terminal to connect to the network, identify the network access means indicated by the various flow identifiers in the flow data files and to obtain the flow identification results. The flow identification unit 3 may identify the network access means corresponding to the flow identifier in the flow data files having flow volume changes as the network access means used by the mobile terminal.

Further, the flow identification apparatus may also include a network access means determining unit 4. The network access means determining unit 4 is configured to determine whether the network access means used by the mobile terminal to connect to the network each time a flow data file is obtained (i.e., each point of time) is the same. If the network access means at each point of time is the same, the network access means determining unit 4 triggers flow volume comparing unit 3. On the other hand, if the network access means at each point of time is not the same, the network access means determining unit 4 triggers the file obtaining unit 1.

In certain embodiments, the file obtaining unit 1, the flow volume comparing unit 2, and the flow identification unit 3 are disposed in the mobile terminal.

In certain other embodiment, the file obtaining unit 1 is disposed in the mobile terminal and uploads the obtained flow data files to a server. The flow volume comparing unit 2 and the flow identification unit 3 are disposed in the server.

Further, the flow identification apparatus may also include a flow display unit 5 disposed in the mobile terminal. The flow display unit 5 is configured to display flow change information based on the flow identification results and the flow data files. The flow change information may include the network access means indicated by the flow identifiers and the data flow generated when the mobile terminal connects to the network using the network access means.

The flow change information may be displayed using a floating window. Further, to avoid the floating window from interfering with the user of the mobile terminal, the floating window may be set to translucent. Further, the floating window may respond to instructions to move the floating window, such that the user can move the floating window to a user-specified position to reduce the interference with the user's using of the mobile terminal.

It should be noted that the above units are used for illustrative purposes, and the functions of the units may be realized in one or more such units or additional units. Further, those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various flow monitoring based applications may be implemented. For example, after a mobile terminal uses the same network access means to connect to the network, at two or more points of time, the flow data files of the mobile terminal are obtained accordingly. The flow volumes with the same flow identifier in the obtained flow data files are compared, and the flow identifier with changing flow volume in the flow data files is determined. Based on the flow identifier with changing flow volume in the flow data files as well as the network access means used by the mobile terminal to connect to the network, the network access means corresponding to the various flow identifiers in the flow data files can be determined.

Thus, no matter how the various flow identifiers in the flow data files are configured, the network access means indicated by the various flow identifiers in the flow data files can be determined, and the data flow generated under the various network access means can also be determined, improving the traffic flow monitoring on the mobile terminal. Further, the mobile terminal can also upload the flow data files to a server, and the server can identify the flow identifiers in the flow data files. After obtaining the flow identification results, the mobile terminal may display flow change information to the user of the mobile terminal using a floating window, reducing the interference with the user's using of the mobile terminal.

What is claimed is:

1. A method for flow identification of a mobile terminal, comprising:
    obtaining flow data files of the mobile terminal at two or more points of time after the mobile terminal connects to a network using a same type of network access means, wherein the network access means including a Wifi network router or a wireless base station;
    from the obtained flow data files, comparing flow volumes in the flow data files having a same flow identifier to determine a flow identifier in the flow data file with changing flow volumes; and
    based on the determined flow identifier in the flow data files with changing flow volumes and the type of network access means used by the mobile terminal to connect to the network, identifying a type of network access means indicated by the flow identifier in the flow data files, and obtaining flow identification results;
    wherein after obtaining flow data files of the mobile terminal at two or more points of time, the method further comprises:
    determining whether types of network access means used by the mobile terminal to connect to the network at each time a flow data file is obtained is the same;
    when the types of network access means at each time a flow data file is obtained is the same, proceeding to compare flow volumes in the flow data files having a same flow identifier to determine a flow identifier in the flow data file with changing flow volumes; and
    when the types of network access means at each time a flow data file is obtained is not the same, repeating the obtaining flow data files of the mobile terminal at two or more points of time;
    wherein:
    the obtaining flow data files of the mobile terminal at two or more points of time further comprises:
        obtaining, by the mobile terminal, locally stored flow data files at two or more points of time after the mobile terminal connects to the network using the same type of network access means; and
        uploading, by the mobile terminal, the locally stored flow data files to a server, and
    the comparing flow volumes in the flow data files, identifying the type of network access means indicated by the flow identifier in the flow data files, and obtaining flow identification results further comprises:
        comparing, by the server, flow volumes in the uploaded flow data files having a same flow identifier to determine a flow identifier in the flow data file with changing flow volumes; and
        based on the determined flow identifier in the flow data files with changing flow volumes and the type of network access means used by the mobile terminal to connect to the network, identifying, by the server, the type of network access means indicated by the flow identifier in the flow data files and obtaining, by the server, flow identification results.

2. The method according to claim 1, wherein the identifying the type of network access means indicated by the flow identifier in the flow data files further comprises:
    identifying the type of network access means corresponding to the flow identifier in the flow data files having flow volume changes as the type of network access means used by the mobile terminal.

3. The method according to claim 1, further comprising:
    obtaining, by the mobile terminal, ROM information of the mobile terminal;
    uploading, by the mobile terminal, the ROM information to the server at the same time when uploading the flow data files;
    obtaining, by the server, the uploaded ROM information of the mobile terminal;
    matching, by the server, the obtained ROM information with information stored in a flow identifier database;
    when there is a match, identifying, by the server, the type of network access means indicated by the flow identifier in the flow data files directly based on the flow identifier database; and
    when there is no match, comparing, by the server, flow volumes in the uploaded flow data files having a same flow identifier to determine a flow identifier in the flow data file with changing flow volumes,
    wherein the flow identifier database stores relationships between ROM information and flow identification results.

4. The method according to claim 1, further comprising:
    displaying, by the mobile terminal, flow change information based on flow identification results and the flow data files using a floating window.

5. A non-transitory computer readable storage medium, storing one or more programs for execution by one or more processors of a mobile terminal, the one or more programs comprising instructions for:
    obtaining flow data files of the mobile terminal at two or more points of time after the mobile terminal connects to a network using a same type of network access means, wherein the network access means including a Wifi network router or a wireless base station;
    from the obtained flow data files, comparing flow volumes in the flow data files having a same flow identifier to determine a flow identifier in the flow data file with changing flow volumes; and
    based on the determined flow identifier in the flow data files with changing flow volumes and the type of network access means used by the mobile terminal to connect to the network, identifying a type of network access means indicated by the flow identifier in the flow data files, and obtaining flow identification results;

wherein after obtaining flow data files of the mobile terminal at two or more points of time, the one or more programs further comprising instructions for:

determining whether types of network access means used by the mobile terminal to connect to the network at each time a flow data file is obtained is the same;

when the types of network access means at each time a flow data file is obtained is the same, proceeding to compare flow volumes in the flow data files having a same flow identifier to determine a flow identifier in the flow data file with changing flow volumes; and when the types of network access means at each time a flow data file is obtained is not the same, repeating the obtaining flow data files of the mobile terminal at two or more points of time;

wherein:

the obtaining flow data files of the mobile terminal at two or more points of time further comprises:

obtaining, by the mobile terminal, locally stored flow data files at two or more points of time after the mobile terminal connects to the network using the same type of network access means; and the comparing flow volumes in the flow data files, identifying the type of network access means indicated by the flow identifier in the flow data files, and obtaining flow identification results further comprises:

comparing, by the mobile terminal, flow volumes in the locally stored flow data files having a same flow identifier to determine a flow identifier in the flow data file with changing flow volumes; and based on the determined flow identifier in the flow data files with changing flow volumes and the type of network access means used by the mobile terminal to connect to the network, identifying, by the mobile terminal, the type of network access means indicated by the flow identifier in the flow data files and obtaining, by the mobile terminal, flow identification results.

6. The non-transitory computer readable storage medium according to claim 5, wherein the identifying the type of network access means indicated by the flow identifier in the flow data files further comprises:

identifying the type of network access means corresponding to the flow identifier in the flow data files having flow volume changes as the type of network access means used by the mobile terminal.

* * * * *